Oct. 28, 1958        D. O. McCOY        2,857,672
NAVIGATION SYSTEM

Filed Sept. 23, 1953        5 Sheets—Sheet 1

INVENTOR.
DAVID O. McCOY
BY Marvin Moody
ATTORNEY

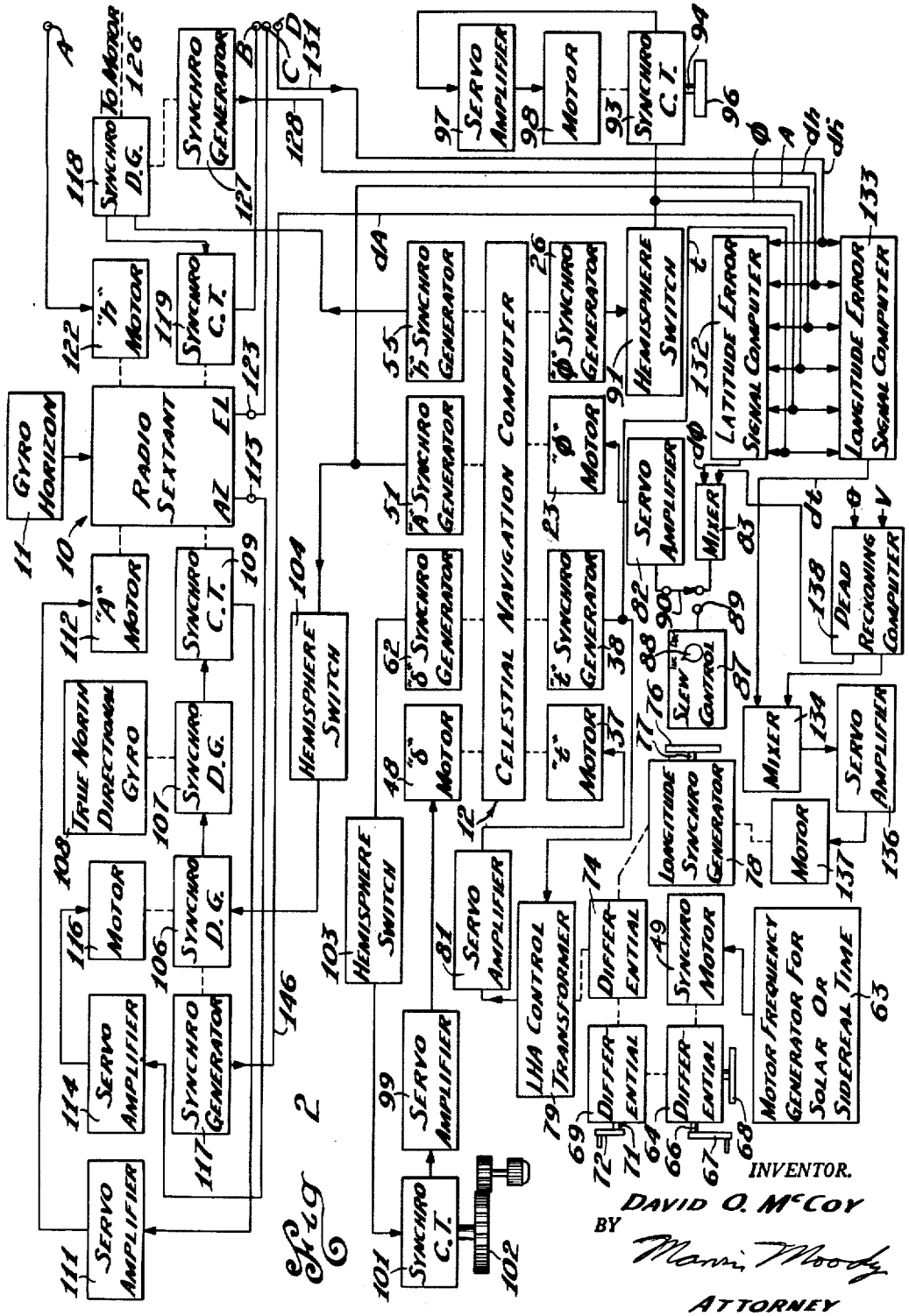

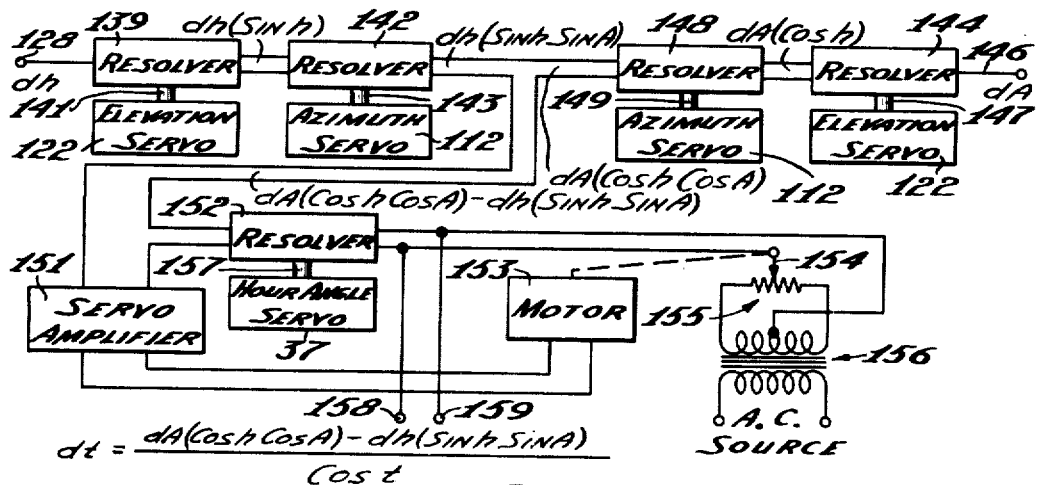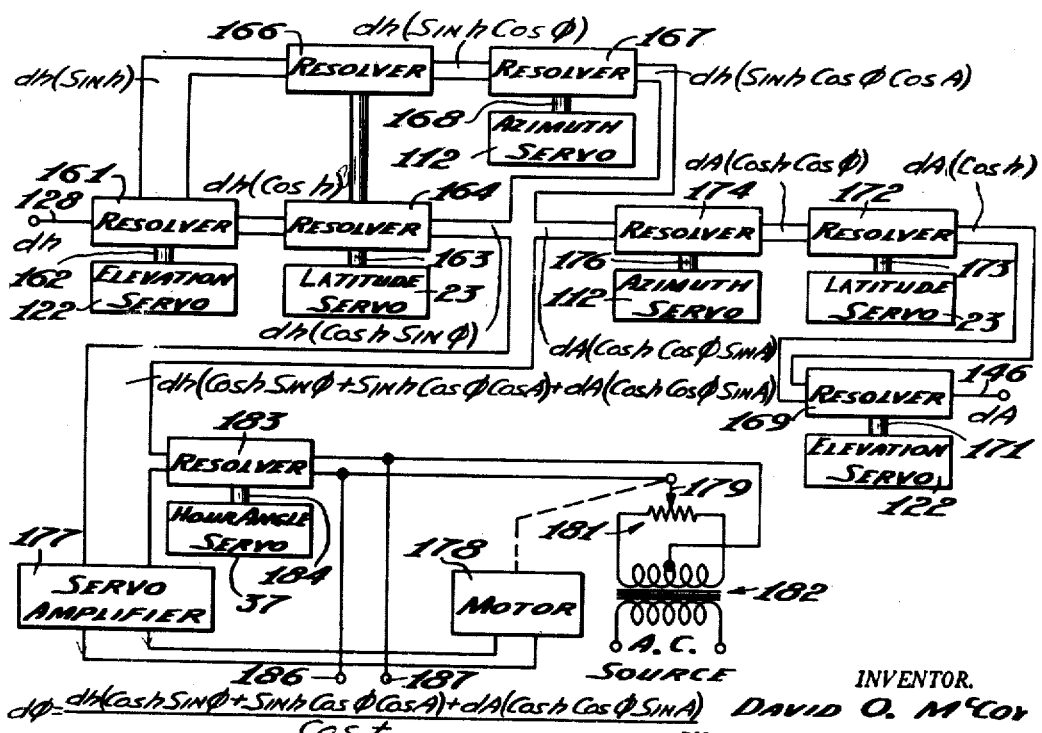

Oct. 28, 1958

D. O. McCOY 2,857,672

NAVIGATION SYSTEM

Filed Sept. 23, 1953

INVENTOR.
DAVID O. McCOY
BY
Marvin Moody
ATTORNEY

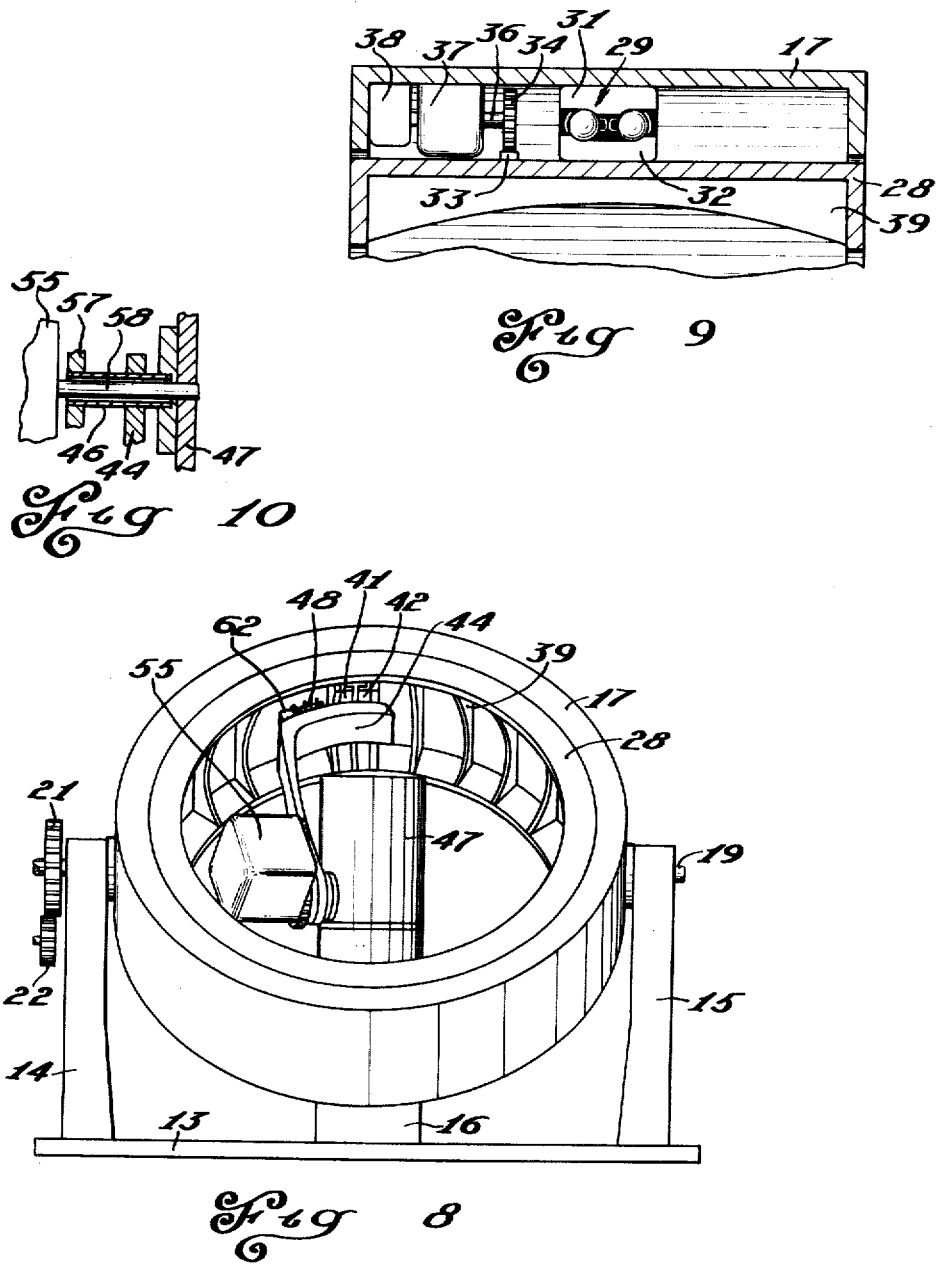

United States Patent Office 2,857,672
Patented Oct. 28, 1958

2,857,672

NAVIGATION SYSTEM

David O. McCoy, Cedar Rapids, Iowa, assignor to Collins Radio Company, Cedar Rapids, Iowa, a corporation of Iowa Application September 23, 1953, Serial No. 381,952

8 Claims. (Cl. 33—1)

This invention relates in general to a navigation system and in particular to apparatus for continuously presenting a fix on a craft.

In navigation the problem has always existed to determine the present position of the observer so that he may correct his heading so as to the arrive at a desired destination.

Recent developments have perfected a radio sextant which allows continuous tracking of the sun or moon. For example, see the abandoned patent application entitled "Radiating Body Tracker" by Curtis M. Hepperle and David O. McCoy, Serial Number 121,126, filed October 13, 1949, and Patent Number 2,458,654 to Southworth. Also see Patents Nos. 2,672,608 and 2,599,381. It is not possible, however, to obtain a fix from a single measurement using the radio sextant or visual sextant alone because only one line of position may be obtained from this measurement. A fix requires the intersection of at least two lines of position.

Various mechanical astronomical calculators have been known, as for example, see Patents 2,108,260 and 2,466,225, wherein with certain known values relating the celestial cordinates to the terrestial coordinates, fixes are obtainable for a particular time. However, such apparatus provides only static results wherein fixes are obtained for a particular time and with an accuracy of the same order as that of the information supplied to the computer.

It is an object of the present invention to combine the features of a continuously tracking sextant, as for example, a radiometric type, with those of a mechanical computer and to compare the outputs and produce error signals proportional to the difference in outputs of the devices so as to provide corrections to the system.

The astronomer provides the navigator with very precise information about the location of the various celestial objects of interest. He also provides the basis of a precise time standard. The equipment for producing a precise time reference has evolved to a relatively high state of development. It is possible at present to provide a time reference in any moving vehicle that is more precise than will be necessary for most applications.

It is therefore apparent that the navigator has at his disposal a very precise knowledge of the position and movements of all celestial bodies. The apparent position and movements of the celestial bodies are not only dependent upon the basic movements, due principally to the rotation of the earth on its axis, but are also due to the position and movements of the observer on the surface of the earth. Because all of these movements are mixed together the process of extracting the position and movements of the vehicle is not an easy one. Navigators have learned to use shortcuts in the mathematical processes and have devised tables of data which assist them in determining their position.

Because the basic rotation of the earth causes the apparent position of all celestial bodies to move constantly, the navigator is called upon to make a relatively complicated computation each time an observation is made. This movement is known, as pointed out above and, in a properly conceived automatic system, this basic movement of the earth should be continuously presented. When this is done all data taken are kept current and any discrepancy in the predicted location of the celestial body is either due to movements of the vehicle or is due to errors in the values of latitude and longitude on which the prediction is based.

In line with the above thinking, one should list all of the bits of information that are pertinent to the situation and should plan for their proper use in the newly conceived system so that unnecessary "strains" on the system can be avoided. In creating a navigational instrument one wishes to devise a system which will determine his position on the surface of the earth and to keep this knowledge up to date as one moves about. If one is successful in applying all of the known factors the system will be called upon only to make corrections for the errors in the original assumptions of latitude and longitude. In this way the error signals on which the system must take action are reduced to static values and the band width of the entire system may therefore be reduced with the associated injection of a maximum amount of integration.

If one were to list the items of information that are of importance in a navigaiton system, the following would be included:

1. Date
2. Greenwich hour angle (GHA) of sun or of vernal equinox
3. Sidereal hour angle of celestial body
4. Declination of celestial body
5. Orientation of horizon plane
6. Direction of north
7. Two measured independent parameters of celestial body under observation
8. Dead reckoning parameters
    (a) Direction of track
    (b) Speed along track Items 1 and 2 are provided by a time reference system within the vehicle. Items 3 and 4 describe the information known about the position of the celestial objects under observation. This knowledge is provided by the astronomer. Items 5 and 6 must be known in order to refer all observations to the position of the observer on the earth. These are the items that define the relation of the observer to the center of the earth and to the direction of its axis of rotation. (It will be shown later that the requirement of an exact north reference may be removed.)

Assume that a computer were built to predict the position and movements of a particular celestial object. If the position of the observer were fixed this computer would be required to use items 1 through 6 above together with a knowledge of the latitude and longitude of the observer. Such a computer is what the astronomer uses to train his telescope. He calls it a polar mount. In the polar mount or computer he fixes latitude by mechanical construction. His longitude and a reference of time are used to calculate the proper setting for the hour angle axis and to drive it at the proper speed to track the celestial object. This removes the effect of the earth's rotation. The declination angle of the celestial object is set into the mount manually. Items 5 and 6 above are used at the time of installation when the mount is leveled and oriented with respect to north. When the polar mount (computer) is well made its prediction of the location and movement of the celestial object is very good. It would be essentially perfect except for the mechanical tolerances involved in the construction of the mount.

In a similar way a navigation computer can be devised to accept the various bits of information listed as items 1 through 6 above. When an estimate of the position of the vehicle in latitude and longitude is also injected the computer will continuously predict the position of the celestial object based on these assumptions. If the errors in the prediction are obtained from a comparison of the output of the computer to the real position of the celestial object, as obtained through the proper use of item 7, one may determine the corrections necessary to perfect the assumed values of latitude and longitude. If the observer's position on the surface of the earth remained fixed, the latitude and longitude errors so determined would remain fixed even though the tracking operation from which they were determined was a dynamic one. Automatic correction of the latitude and longitude inputs to the computer would obviously be accomplished by closing servo loops on these axes.

A system based on knowledge of items 1 through 7 could therefore be created and would fulfill all of the basic requirements necessary to obtain a solution to the problem. Such a system would be a pure celestial navigation system. If the observer were to remain fixed at an unknown location the system would quite adequately determine this position. If the observer were then to be allowed to move about on the surface of the earth the system would begin immediately to correct its indications of latitude and longitude and would attempt to keep up with the movements of the vehicle. Since the entire system, although complex, would function as a simple servo mechanism, the rate movements of the vehicle in latitude and longitude would generate the usual rate lags associated with simple servo mechanisms. Such rate lags are undesirable since they cause the system to indicate values of latitude and longitude that lag behind the actual position of the vehicle as it moves.

Some knowledge of the movements of the vehicle is usually available in any modern vehicle. Such movements are usually measured in a plane polar coordinate system and are given in terms of "direction of track" and "speed along track." If this information is injected into the system in the proper way the rate of change of position of the vehicle is accounted for in the system. On this basis the above mentioned rate lags are no longer necessary. This rate information about the movements of the vehicle which are commonly referred to as dead reckoning parameters are listed above as item 8.

In a system of this type both celestial and dead reckoning information occupy their natural positions in the overall system. The ability of celestial data to provide continuous information about the absolute position of the vehicle is combined with the ability of dead reckoning data to inform the system of current movements of the vehicle. The use of spherical coordinates allows the system to make all computations in a natural way without the necessity for laborious corrections for the curvature of the earth. During periods when celestial information is not available the system continues to function as a dead reckoning system with no change other than the immobilization of the celestial inputs.

The system has been conceived to combine in the most natural way all of the pertinent facts known about the position and movements of both the vehicle and the celestial object under observation.

In this way, maximum use is made of both dead reckoning equipment and celestial tracking instruments. The system is automatic and continuous in its operation. It not only relieves the navigator of the laborious computations necessary to obtain a fix but through the use of dead reckoning information essentially eliminates the delay involved in such calculations. The cumulative errors present in all dead reckoning systems during long range or global journeys are in turn avoided through the use of celestial information. In combining all of this information in the proper way on a continuous basis, it is possible to effectively integrate or average all data over a much longer time than is possible by other means.

The analysis that follows is intended to establish two facts as follows:

(a) That a comparison of the output of a radio sextant and the computer's prediction is a necessary and sufficient requirement to completely correct the computer alignment.

(b) That the analog computers required to obtain the necessary error signals associated with the integrating correction servos are based on sufficiently simple mathematical expressions to be satisfactorily realized in practice.

As has already been stated, the problem at hand is to compare the actual motion of the sun with the predicted motion as given by the computer. By proper handling and processing of this comparison we can determine the corrections in latitude and longitude required to perfect the computer's prediction. This analysis deals with the various angles of the celestial sphere shown in Figure 1. Observation of Figure 1 shows that five angles are involved. These are as follows:

$\delta$ = Declination angle of celestial body
$t$ = Hour angle of celestial body
$\phi$ = Latitude of observer
$h$ = Altitude angle of celestial body
$A$ = Azimuth angle of celestial body The longitude of the observer is submerged in the hour angle ($t$) since the difference between the local hour angle as observed is less than the Greenwich hour angle by the longitude angle of the observer. This longitude is obtained by a simple subtraction process using the local hour angle and the sidereal hour angle of the celestial body together with the Greenwich hour angle of the sun or of the vernal equinox. The last quantity together with a solar or sidereal time motor drive constitutes the time reference system.

The basic spherical trigonometric equations that relate the above five angles are as follows:

(1) $\sin \delta = \sin h \sin \phi - \cos h \cos \phi \cos A$
(2) $\cos \delta \cos t = \sin h \cos \phi + \cos h \sin \phi \cos A$
(3) $\cos \delta \sin t = \cos h \sin A$ These equations are exact and completely define the relations between these angles. For convenience the discussion that follows will consider the use of the automatic radiometric sextant which is assumed to be tracking the sun. The discussion holds equally well if some other celestial body is being tracked.

From Equations 1, 2 and 3 one must obtain expressions for the errors in "$\phi$" and "$t$" in terms of the errors as obtained from a comparison of the output of the computer and the automatic tracking instrument. Observation of the operation of a radiometric sextant that uses proportional servo systems shows that the first time derivatives of the motions of the sun have a signal to noise ratio good enough to make them quite usable. This is desirable because it allows us to calculate our position using not only information as to "where the sun is" but also using information as to "what direction and speed the sun is moving." The celestial coordinate angles of the sun are known and can be set into the computer with as much precision as desired. The Greenwich hour angle of the sun is available with very high accuracy. The measurement of local hour angle therefore is a measure of the longitude of the observer. We will assume in this discussion that solar time is used. If some other celestial object is used, the concept of sidereal hour angle should be used and the rotation rate of the computer changed to sidereal time.

The simplest mathematical form that has been found for the errors in latitude and longitude are obtained by fixing the declination angle in the computer and by extracting the errors in altitude angle and its first time derivative by comparing the output of the computer with that of the sextant. On this basis the following mathematical analysis may be made.

Solving Equations 1 and 2 for cos $A$ and equating them to eliminate "$A$" we obtain:

(4) $$\frac{\sin h\,\phi - \sin \delta}{\cos \phi} = \frac{\cos \delta \cos t - \sin h \cos \phi}{\sin \phi}$$

from which we obtain:

(5) $\sin h - \sin \delta \sin \phi = \cos \phi \cos \delta \cos t$

Equation 5 is an exact expression relating $h$, $\phi$, $\delta$ and $t$. Differentiating this expression assuming all parameters are in error we obtain:

(6) $[\cos h]dh = [\cos \delta \sin \phi - \cos \phi \sin \delta \cos t]d\delta + [\sin \delta \cos \phi - \sin \phi \cos \delta \cos t]d\phi - [\cos \phi \cos \delta \sin t]dt$ Equation 6 is an exact expression relating an error in "$h$" with corresponding errors in $\delta$, $\phi$ and $t$. If we fix "$\delta$" in the computer by setting in its known value, then:

$$d\delta = 0$$

The resulting expression will give the error in "$h$" that is caused by an error in $\phi$ and $t$. This is one of the expressions needed. It is given below:

(7) $$dh = \left[\frac{\sin \delta \cos \phi - \sin \phi \cos \delta \cos t}{\cos h}\right]d\phi - \left[\frac{\cos \phi \cos \delta \sin t}{\cos h}\right]dt$$

Substituting Equation 3 into the above expression we obtain:

(8) $$dh = \left[\frac{\sin \delta \cos \phi - \sin \phi \cos \delta \cos t}{\cos h}\right]d\phi - [\cos \phi \sin A]dt$$

Continue by substituting for sin $\delta$ its value given by Equation 1 and for cos $\delta$ cos $t$ its value given by Equation 2:

(9) $$dh = \left[\frac{(\sin h \sin \phi - \cos h \cos \phi \cos A)\cos \phi - \sin \phi(\sin h \cos \phi + \cos h \sin \phi \cos A)}{\cos h}\right]d\phi - [\cos \phi \sin A]dt$$

Expanding and simplifying the above expression we obtain:

(10) $dh = -[\cos A]d\phi - [\cos \phi \sin A]dt$

Equation 10 is simple and exact. It is intuitively correct as can be seen from study of the celestial sphere. For example, when "$A$" equals zero or $\pi$, an error in "$h$" is directly an error in "$\phi$." Likewise, when $$A = \frac{\pi}{2}; \frac{3\pi}{2}$$

etc., an error in "$h$" is produced by an error in "$t$" only, scaled down by the factor cos $\phi$. This is not as easily seen although it comes about because of the fact that as $\phi$ varies, point P (Figure 1) rotates about an east-west axis through the horizon plane. This circle is tangent to the horizon plane when $$A = \frac{\pi}{2}; \frac{3\pi}{2}$$

etc. Therefore, an error in $\phi$ creates no change in "$h$" at these locations.

Equation 10 is, however, only part of the story. An error in "$h$" may exist because of an error in either $\phi$ or $t$ or by a combination of the two. Equation 10 does not tell us how it is divided except when $$A = 0; \frac{\pi}{2}; \frac{3\pi}{2}$$

etc. This, of course, is exactly what is inferred mathematically when only one equation in two unknown exists.

To obtain another equation we may take the time derivative of Equation 10 to obtain:

(11) $d\dot{h} = -\cos A\,d\dot{\phi} + \sin A\,d\phi\,\dot{A} - \cos \phi \sin A\,dt + \sin \phi \sin A\,dt\dot{\phi} - \cos \phi \cos A\,dt\dot{A}$ In the expression above, and in those that follow, the dot over a quantity indicates the time derivative of that quantity.

Equation 11 is the second expression to be solved simultaneously with Equation 10 to obtain expressions for "$d\phi$" and "$dt$" in terms of $dh$ and $d\dot{h}$.

Manipulating these expressions we obtain the following equation for the error signals:

(12)
$$d\phi = \frac{\sin A\left(\dfrac{d\dot{h}}{\dot{A}}\right) + \sin A \cos A\left(\dfrac{d\phi}{\dot{A}}\right) + \cos \phi \sin^2 A\left(\dfrac{d\dot{t}}{\dot{A}}\right) + \left[\tan \phi \sin A\left(\dfrac{\dot{\phi}}{\dot{A}}\right) - \cos A\right]dh}{1 - \tan \phi \sin A \cos A\left(\dfrac{\dot{\phi}}{\dot{A}}\right)}$$

(13)
$$dt = -\frac{1}{\cos \phi}\left[\frac{\cos A\left(\dfrac{d\dot{h}}{\dot{A}}\right) + \cos^2 A\left(\dfrac{d\phi}{\dot{A}}\right) + \cos \phi \sin A \cos A\left(\dfrac{d\dot{t}}{\dot{A}}\right) + \sin A\,dh}{1 - \tan \phi \sin A \cos A\left(\dfrac{\dot{\phi}}{\dot{A}}\right)}\right]$$

Equations 12 and 13 show the existing error in latitude and in longitude that must exist to account for the observed difference in "$h$" and "$\dot{h}$" when these quantities, as predicted by the computer, are compared to those found to exist by the radio sextant. Actually, Equations 12 and 13 are differential equations in $d\phi$ and $dt$. While solutions for these equations have not as yet been obtained, the use of these equations will still produce the desired result.

To correct the celestial computer, it is therefore necessary to generate error signals in "$\phi$" and in "$t$" as indicated by Equations 12 and 13 and to close servo loops in these two coordinates. In order to take advantage of the fact that the sextant is tracking the sun for long periods of time, these servo loops will be made with very low gain. By so doing, the correction of an error will be exponential with a very long time constant and a large amount of integration will thereby be injected. With a long integration time the random variations in the angle measurements are further reduced in the system. Also cyclic variations in the pointing of the antenna of the sextant caused by stable platform errors, etc., will be very effectively integrated out.

Equations 12 and 13 are exact expressions. These expressions involve not only the expected terms in "$dh$" and "$d\dot{h}$" but also ones in "$d\phi$" and "$dt$." The velocity of the vehicle in latitude ($\dot{\phi}$) is also involved which is known from dead reckoning sources. It is thus shown that the computer can be re-aligned completely by a comparison of its output to that of the radio sextant together with a knowledge of the latitude velocity of the vehicle ($\dot{\phi}$). It can easily be seen from Equations 12 and 13 that when the vehicle is not moving in latitude ($\dot{\phi}=0$) that the comparison of the computer and the radio sextant is sufficient for the purpose.

It is felt that considerable simplification can be made without jeopardizing the performance of the instrument, Obviously, a major simplification can be effected if the term $$\text{"}\tan \phi \sin A \cos A\left(\frac{\phi}{A}\right)\text{"}$$

can be neglected in comparison to unity. Dead reckoning information injects the velocity component of the vehicle into the computer. The terms in $d\phi$ and $dt$ in Equations 12 and 13 would normally be eliminated by a solution to these differential equations. The solution to these equations is difficult to obtain; however, the solution can be obtained by inserting these terms in the error signal computers. These computers will then serve as analog computers to solve these differential equations in addition to the prime function of determining their respective error signals.

A second method of solving the problem is based on knowledge of the correct values of both angles "$A$" and "$h$." Here a precise knowledge of the altitude angle ($h$) requires as before a precisely defined horizon plane. A precise knowledge of azimuth angle ($A$) requires a carefully defined direction of north.

By differentiating Equation 3 and assuming that "$\delta$" is known, the following expression is obtained:

(14) $\cos \delta \cos t\, dt = -\sin h \sin A\, dh + \cos h \cos A\, dA$

Rearranging this expression, to obtain an expression for the hour angle error in terms of the known error in azimuth and altitude angles:

(15) $dt = \dfrac{[\cos h \cos A]dA - [\sin h \sin A]dh}{\cos \delta \cos t}$

Differentiating Equation 1 similarly, the following expression is obtained:

(16) $0 = \cos h \sin \phi\, dh + \sin h \cos \phi\, d\phi + \sin h \cos \phi \cos A\, dh + \cos h \sin \phi \cos A\, d\phi + \cos h \cos \phi \sin A\, dA$ Rearranging the above expression and using Equation 2 for one substitution, the following expression for the error in latitude angle is obtained:

(17)
$$d\phi = -\dfrac{[\cos h \sin \phi + \sin h \cos \phi \cos A]dh + [\cos h \cos \phi \sin A]dA}{\cos \delta \cos t}$$

It will be noticed that the denominator in both these operations is $\cos \delta \cos t$. Since "$t$" varies widely passing through 90 degrees, it must remain in the expressions since the reversal of sign of this factor would if neglected change the servo system from a degenerative to a regenerative one. On the other hand, $\cos \delta$ is always a positive number and nearly equal to unity since $\delta$ (declination angle) of the sun varies only from $+23$ degrees to $-23$ degrees. If a star were being used one would be chosen near the celestial equator and therefore the same condition exists. One may, therefore, neglect $\cos \delta$ in the denominator of these expressions since it only serves to vary the loop gain slightly. On this basis, the above two error function expressions reduce to the following approximate expressions:

(18) $dt \cong \dfrac{[\cos h \cos A]dA - [\sin h \sin A]dh}{\cos t}$

(19)
$$d\phi \cong \dfrac{[\cos h \sin \phi + \sin h \cos \phi \cos A]dh + [\cos h \cos \phi \sin A]dA}{\cos t}$$

The above equations can be generated in a straightforward, simple way.

The above discussion has shown that a computer can be produced that will utilize the output of a radiometric sextant or equivalent automatic tracking instrument to correct the accuracy of prediction of a celestial computer in which a very long time of integration is used. Advantage is thus taken of the continuously tracking feature of the radio sextant to improve the accuracy of the fix. It also shows that the output of the sextant alone produces sufficient information for this purpose. Effective damping and filtering of many variations are inherent in this system. By the injection of dead reckoning data into the computer two things are accomplished; namely:

(1) High frequency components of the motions of the vehicle over the surface of the earth are injected, thus allowing the computer to act as a dead reckoning computer in the absence of celestial data.

(2) The injection of velocity data from dead reckoning sources injects forward rate control to the computer-error servos, thereby reducing the velocity lags in these servo systems to second-order magnitudes. By using the computer to drive the radio sextant, the servo systems associated with the sextant also realize these same benefits.

It should be pointed out that the celestial data used in correcting the computer need not be restricted to the radio sextant. Similar data can be accepted by it from an optical star tracker when such data is available. On this basis, the computer becomes a master navigation instrument accepting celestial data from several sources as available in addition to using dead reckoning data. In the absence of all celestial data, it continues as a straight dead reckoning system until celestial data is again resumed.

The position of a vehicle on the surface of the earth can be resolved into two orthogonal coordinates commonly called "longitude" and "latitude." If the position and motions in each of these coordinates is analyzed on a Fourier basis, as is commonly done in servo analysis, one will obtain a frequency spectrum varying from zero frequency up to the higher frequency components required by the velocity and acceleration of the vehicle. In the present system the information for the various portions of the spectrum is obtained from the source best suited to supply it. The low frequency components are to be supplied by a celestial means whereas the high frequency components are to be supplied from dead reckoning sources. The choice of system characteristics depends on the relative quality of the data received from the various sources.

Herein described will be a computer which will solve Equations 12 and 13 and which will ignore certain terms that have negligible effect.

Figure 2 illustrates a portion of the overall system of the invention;

Figure 4 illustrates the longitude error signal computer;

Figure 5 illustrates the latitude error signal computer;

Figure 8 is a side view of the mechanical computer with members rotated relative to Figure 6;

Figure 9 is an enlarged detail view showing the support for the inner ring; and, Figure 10 is a detail view of a concentric shaft in this system.

Figure 3:
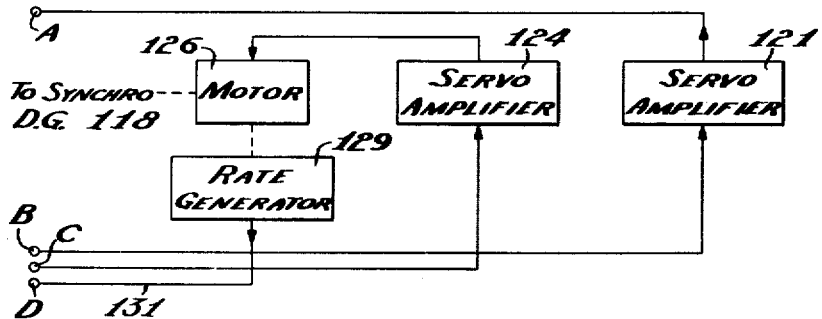
Figure 3 illustrates another portion of the overall system.
Figure 1:
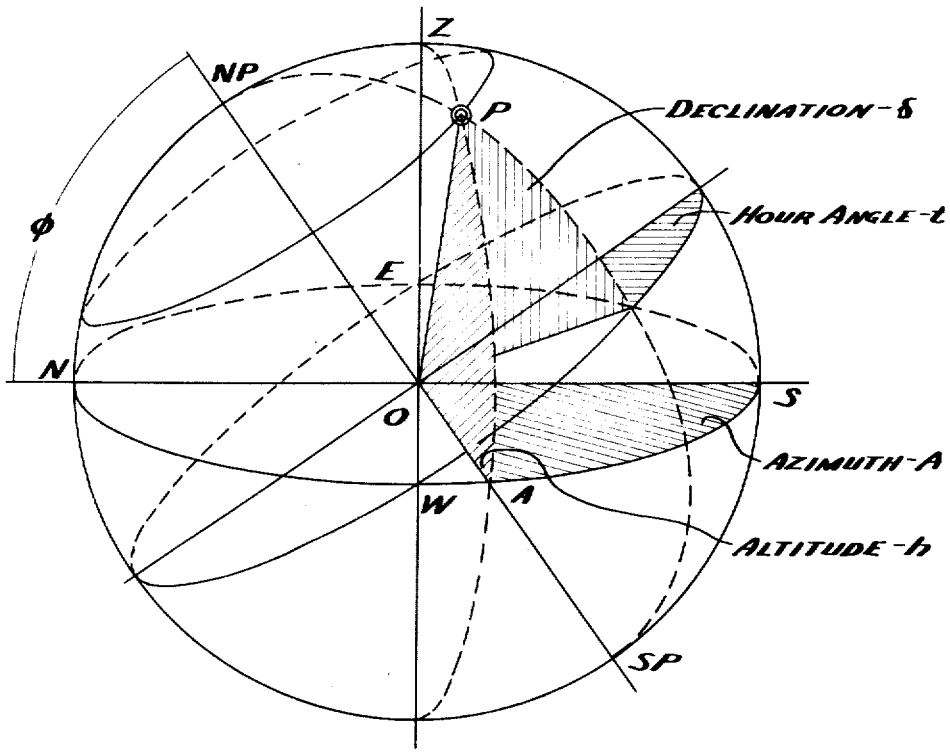
Figure 1 illustrates the general navigation problem.

Referring to Figures 2 and 3, a radiometric sextant is designated generally as 10 and is controlled by a gyro horizon 11 so as to maintain a horizontal reference. The radiometric sextant may be such as described in the abandoned application of Curtis M. Hepperle and David O. McCoy entitled "Radiating Body Tracker," Serial Number 121,126, filed October 13, 1949.

Also forming a part of the completed system is a mechanical navigation computer designated generally as 12 and which is shown in greater detail in Figures 6, 7, 8 and 9. As best shown in these figures, a base plate 13 has mounted thereon three uprights 14, 15 and 16.

A first annular member 17 is supported on suitable stub shafts 18 and 19 mounted in the uprights 14 and 15. A driving gear 21 is attached to the end of the stub shaft 18 and engages a gear 22 attached to a latitude motor 23 mounted to the upright 14 by standoffs 24. A latitude synchro generator 26 is attached to the shaft 18 and is supported by suitable brackets 27 from upright 14. Generator 26 produces an electrical output proportional to the position of the shaft 18 which corresponds to latitude. For simplicity of this discussion, only a one-speed synchro system is shown.

Rotatably mounted within the ring 17 and concentric therewith is a second ring 28 which is supported, as shown in the detailed sectional view Figure 9, by the outer ring 17 by bearings 29 mounted in raceways 31 and 32. An annular rack 33 is attached to the inner ring 28 and is engaged by a pinion 34 mounted on the output shaft 36 of an hour angle driving motor 37 which is attached to the outer ring 17. An hour angle synchro generator 38 is connected to ring 17 and is driven by motor 37 through suitable gear reduction.

Figure 6:
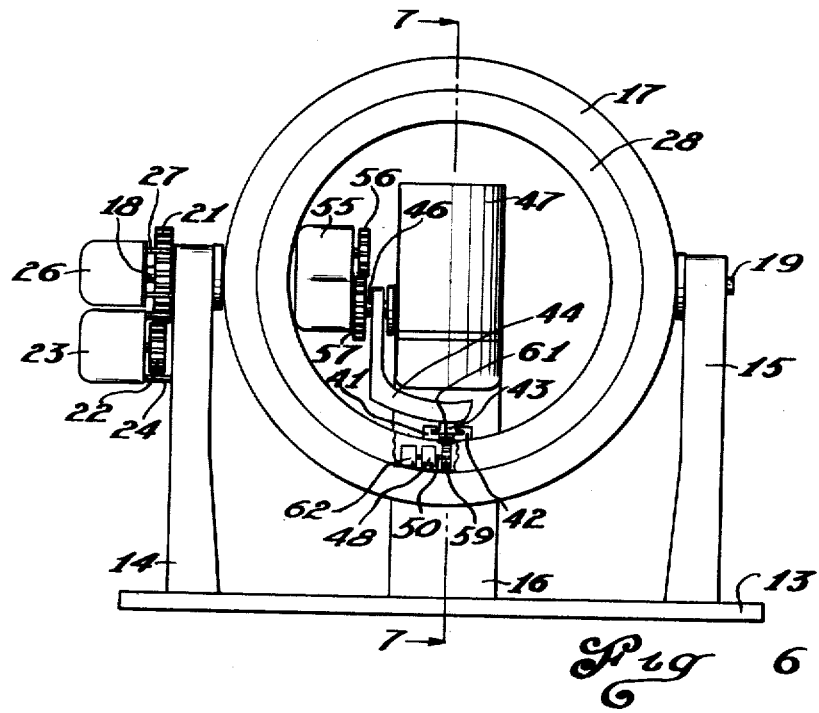
Figure 6 is a side view of the mechanical computer.
Figure 7:
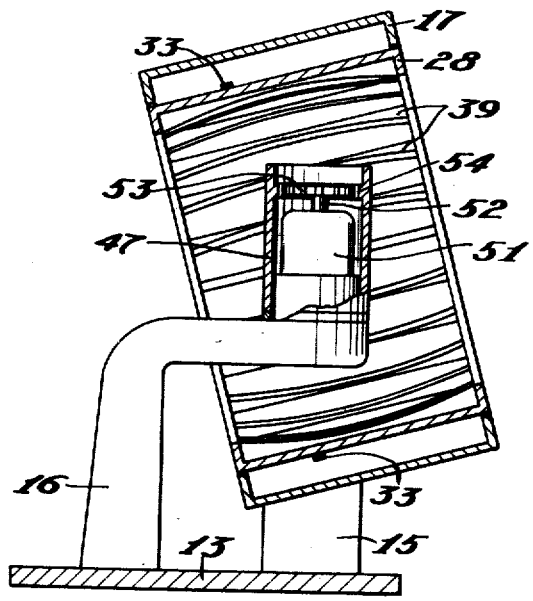
Figure 7 is a sectional view taken on line 7—7 of Figure 6.

The inner ring 28 is formed with a plurality of structural ribs 39 as shown. A pair of guide members 41 and 42 are mounted transversely on the inner surface thereof and form a slot which receives a pin 43 therein as shown in Figures 6 and 8. An L-shaped arm 44 pivotally supports a second rack 61 mounted on pin 43. The arm 44 is rotatably supported on a horizontal shaft 46 which is connected to a sleeve 47 rotatably supported on the third L-shaped supporting member 16.

An azimuth synchro generator 51 is fixed to the L-shaped member 16 within the sleeve 47 and has an output shaft 52 which carries a spline 53 that meshes with internal teeth 54 on the sleeve 47.

An elevation synchro generator 55 is coupled to the arm 44 as shown in Figures 6 and 10. A supporting shaft 58 forms a mechanical support between the sleeve 47 and generator 55. A hollow shaft 46 fits over shaft 58 and carries arm 44. A gear 57 is also attached to shaft 46. Gear 57 meshes with gear 56 which is mounted on the input shaft of synchro generator 55.

A declination motor 48 is mounted to the inner ring 28 and has an output shaft 50 which carries a gear 59 that meshes with the second rack 61 that is attached to the arm 44. This moves arm 44. A declination synchro generator 62 is connected to the motor 48 to produce an electrical output proportional to the declination angle.

The mechanical computer illustrated is capable of continually pointing to a moving celestial body if the hour angle ring 28 is positioned to the local hour angle of the body and if the latitude axis 18 is positioned to the latitude of the observer and if the declination fixture is set to the correct declination for the observed body. It is to be realized, of course, that stars have constant declination and there is no declination correction required in this case. However, the sun's declination varies as much as 8 degrees per month and between plus and minus 23 degrees.

The local hour angle motor 37 will keep the pointer or pin 43 continually pointing toward a celestial body after once adjusted to point toward it if the latitude motor 23 is locked and the local hour angle motor 37 is driven at the correct rate, assuming that the observer's position is stationary and that the device is orientated with respect to true north. However, if the observer's position is moving, as for example, on board a ship or aircraft, the hour angle rate must be corrected to include the motion of the observer's craft relative to the surface of the earth and the latitude motor must be driven so as to change according to the observer's motion.

As shown in Figure 2, the local hour angle is provided by driving a synchronous motor 49 with the output of a stable oscillator 63 which produces a frequency proportional to solar or sidereal time. Thus, the synchronous motor 49 might run at a speed such that its shaft turns 15 degrees per hour. This rate would correspond to the change of the local hour angle of the sun, assuming that a fixed geographical position was maintained. Since celestial positions are referenced to the first point of Aries, this must be adjusted by connecting the output of the synchronous motor 49 to a first differential 64 which receives a manual input from shaft 66 controlled by the knob 67 proportional to the Greenwich hour angle of the sun or of the vernal equinox.

This will be indicated on the dial 68 connected to the differential 64. The output of the differential 64 is connected to a second differential 69 which has an input shaft 71 connected to a knob and dial 72 that is adjusted to the sidereal hour angle of the celestial body under observation. Another differential 74 is connected to differential 69. A longitude dial 76 is attached by shaft 77 to a longitude synchro generator 78 which is shafted to the differential 74.

A control transformer 79 is connected to the differential 74 and produces an output proportional to the local hour angle of the celestial body. The local hour angle is derived by subtracting the longitude from the Greenwich hour angle of the body. This is accomplished by the differential 74.

A servo amplifier 81 receives the output of the local hour angle synchro control transformer 79 and is connected to the local hour angle motor 37 mounted to drive ring 28. The synchro generator 38 is electrically connected to the synchro control transformer 79 so that the motor 37 will run until the output of the synchro control transformer 79 is zero.

The latitude motor 23 receives an electrical input from a servo amplifier 82. Amplifier 82 is connected to a two-way switch 90 that may be moved to contact the output of a mixer 83 or to a contact 89 which is connected to a slew control 87. A knob 88 is mounted on control 87 to cause motor 23 to run to an assumed latitude at the starting time. Thus, the slew control 87 is used when the computer is started, but under automatic operation, switch 90 is connected to mixer 83.

The latitude synchro generator 26 is connected to a hemisphere switch 91 which has its output connected to a latitude synchro control transformer 93 which has an output shaft 94 connected to a latitude dial 96.

Transformer 93 produces an electrical output that is connected to a servo amplifier 97 that drives a latitude indicating motor 98 connected to the synchro control transformer 93. The dial 96 indicates the latitude to which the computer 12 is adjusted.

For declination correction, the declination motor 48 receives an input from a servo amplifier 99 which is electrically connected to a declination synchro control transformer 101 which is controlled by a declination knob 102 that is periodically set to the correct declination. Since declination changes rather slowly, this adjustment may be made infrequently. A hemisphere switch 103 is connected electrically to the synchro control transformer 101 and to the declination synchro generator 62.

The azimuth and elevation synchro generators 51 and 55 are mounted, respectively, on shafts 52 and 46 and produce outputs from the navigation computer for a purpose to be later described. The azimuth signal supplied by the azimuth synchro generator 51 is supplied through a hemisphere switch 104 to a synchro differential generator 106 which has its output connected to another synchro differential generator 107 which receives a shaft input from a true north directional gyro 108.

The directional gyro 108 changes the output of the second synchro differential generator 107 from azimuth to relative bearing of the body being tracked. A synchro control transformer 109 receives an input from the differential generator 107 and is shafted to the radiometric sextant 10. It produces an output which is fed to a servo amplifier 111 that is connected to the azimuth driving motor 112 connected to the azimuth shaft of the radio sextant 10.

Thus, the azimuth signal derived by the navigation computer 12 is supplied to the radio sextant 10 to cause it to track the celestial body. However, as described in the co-pending patent application, the radio sextant has independent means of measuring azimuth, and an azimuth error signal will appear at terminal 113. This is supplied to a servo amplifier 114 that is connected in turn to a servo motor 116 which supplies a shaft input to the synchro differential generator 106. The result is that the azimuth servo control system will form a closed loop such that the motors 112 and 116 will run until the output of the celestial navigation computer and the sextant will be balanced and equal zero.

A synchro generator 117 measures the correction injected by the synchro differential generator 106 to produce an azimuth error signal.

In a similar fashion the elevation synchro generator 55 of the navigation computer 12 is connected to a synchro differential generator 118 which furnishes an output to a synchro control transformer 119 driven by the elevation shaft of the sextant 10. The transformer in turn supplies an electrical input to a servo amplifier 121, as shown in Figure 3, which is connected to the elevation drive motor 122 mounted on the elevation shaft of the sextant. An elevation error signal is produced at terminal 123 of the radio sextant such as described in patent application Serial Number 121,126 filed October 13, 1949, and is fed to the servo amplifier 124 to drive a motor 126 which is connected to the synchro differential generator 118.

A synchro generator 127 is connected to the motor 126 to produce an elevation error signal to lead 128 and a rate generator 129 is connected to the motor 126 to produce a rate of change of elevation error signal which is supplied to lead 131.

A latitude error signal computer 132 and a longitudinal error signal computer 133 produce signals, respectively, proportional to the latitude and hour angle errors indicated by the differences between the two measuring devices. The output of the latitude error computer 132 is supplied to mixer 83 which supplies an output to servo amplifier 82 which is in turn connected to the latitude motor 23 of the celestial computer.

The hour angle error signal computer 133 supplies an output to a mixer 134 which is connected to a servo amplifier 136 that is connected to a motor 137 which supplies an input to the longitude synchro generator 78 which goes through the angle correcting circuits to drive the hour angle motor 37.

A dead reckoning computer 138 is also connected to mixers 83 and 134 and produces signals proportional to the computed rate of change of latitude and longitude. For example, the dead reckoning computer might be a trigometric resolver such as shown in the patents to Agins #2,465,624 and #2,467,646, issued March 29, 1949, and April 19, 1949, respectively, wherein speed and heading is resolved into X and Y components so as to indicate rate of change of latitude and of longitude.

Figure 4 illustrates the detailed circuitry of a particular longitude error computer which solves Equation 18. Lead 128 from synchro generator 127 is connected to a resolver 139 which has a controlled shaft 141 that is driven by the elevation positioning servo 122. An output from resolver 139 is $dh \sin h$.

This is fed to another resolver 142 which has an output shaft 143 that is connected to the azimuth servomotor 112 and the output of this resolver is $dh(\sin h \sin A)$.

Another resolver 144 receives an input from the synchro generator 117 by a lead 146 and has an input shaft 147 connected to servomotor 122. The output of resolver 144 is $dA \cos h$. This is fed to another resolver 148 which has its input shaft 149 connected to the azimuth servomotor 112 to produce an output $$dA(\cos h \cos A)$$

The outputs of resolvers 142 and 148 are subtracted to produce $dA(\cos h \cos A) - dh(\sin h \sin A)$.

This is supplied to a servo amplifier 151 and to another resolver 152. Servo amplifier 151 is connected to a motor 153 which drives a variable contact 154 across a potentiometer 155 which is energized by transformer 156. The primary of this transformer is energized by a suitable alternating current power supply. The midpoint of the secondary is connected to resolver 152. The contact 154 is also connected to the resolver 152. An input shaft 157 is connected to the resolver 152 and is driven by the hour angle servomotor 37. The output of the resolver 152 appears at terminals 158 and 159 and is the solution of Equation 18, as will be explained later.

In a similar fashion the apparatus shown in Figure 5 computes the latitude error and solves Equation 19.

The elevation error $dh$ from lead 128 produced by synchronous generator 127 is supplied to a resolver 161 which has its input shaft 162 connected to the elevation servomotor 122.

The latitude drive motor 23 of the celestial navigation computer is connected to a shaft 163 which positions resolvers 164 and 166. Resolvers 164 and 166 receive the output of the resolver 161. A resolver 167 has its output shaft connected to the azimuth servomotor 112 and receives an electrical input from resolver 166. A resolver 169 receives the azimuth error from the synchronous generator 117 through lead 146 and has its input shaft 171 connected to the elevation servo drive motor 122. The output of this resolver is connected to another resolver 172 which has its input shaft 173 connected to the latitude servomotor 23.

The output of this resolver is electrically connected to another resolver 174 which has its output shaft 176 connected to the azimuth servomotor 112. The outputs of resolvers 164, 167 and 174 are combined and supplied to a servo amplifier 177 which supplies an output to a motor 178 which drives a variable contact 179 of potentiometer 181. A transformer 182 is connected to the potentiometer 181 and its primary is connected to a suitable alternating current source. This alternating current source of a particular frequency, which may conveniently be 400 cycles per second, is usually also connected to transformer 156 of Figure 4 and to the synchro generator of Figure 2. A particular reference amplitude, such as one volt, is applied to the synchro generators, but a voltage several times this value may be required at the secondary windings of transformers 155 and 181 that are connected to potentiometer 154 of Figure 4 and potentiometer 181 of Figure 5 respectively. The midpoint of the secondary of the transformer and the contact 179 are connected to a resolver 183 which has its input shaft 184 connected to the hour angle servomotor 37. The solution of Equation 19 appears at terminals 186 and 187.

The outputs of the resolvers are shown on the drawings and it is to be noted that they are purely trigometric functions. In other words, to solve Equations 18 and 19, it is to be noted that Equation 18 comprises the product of the elevation error multiplied by the product of the cosines of the elevation and azimuth, and subtracted from this quantity is the product of the elevation error multiplied by the sines of the elevation and azimuth. This is accomplished in Figure 4 by the resolvers 139, 142, 148 and 144. This subtraction is made by the connection as shown so that the numerator of Equation 18 appears as inputs to the servo amplifier 151 and the resolver 152. The division by cosine $t$ which is required in Equation 18 is accomplished by taking advantage of the fact that if it is desired to obtain a value C which is equal to the quotient of A and B as follows:

$$C = \frac{A}{B}$$

The voltage C may be multiplied by B and servo control the result to equal A. This completely defines C. This principle is utilized in the resolvers 152, 183, motors 153, 178, and potentiometers 155 and 181. It is much easier to obtain a product than a quotient. Thus the transformation.

Manipulation by combinations of resolvers so as to perform multiplication is well known to those skilled in the art and the basic theory of resolvers and their outputs will not be set out herein. The important fact to remember is that the Equations 18 and 19 or alternatively Equations 12 and 13 are solved so that the output of the latitude and longitudinal error signal computers 132 and 133 note the variations between the prediction of the celestial navigation computer 12 and the radio sextant 10.

It is to be noted that the outputs of these computers are fed through the mixers 83 and 134 ultimately to the hour angle motor 37 and the latitude motor 23 of the computer so that the computer is adjusted and the entire system forms a closed servo loop. The various motors will run and adjust the various axes of the computers until the output of the computer and the sextant coincide.

The various servo systems and loops perform integration of the rapid fluctuations of the sextant which are caused by instability of the platform and inaccuracies due to inherent fluctuations of the gyro compass will be integrated out. Thus, the fix indicated continuously by the latitude dial 96 and the longitude dial 76 will be correct and continuously indicate the correct position of the moving craft.

In operation if, for example, the sun is to be tracked, the knob 67 is adjusted to the Greenwich hour angle of the sun at the particular time and the assumed longitude is set in to the differential 69 by a slewing mechanism not shown. The craft's heading and velocity are supplied to the dead reckoning computer 138 which resolves it into the rate of change of latitude and rate of change of longitude which are supplied to the system. The declination knob 102 is set to the correct declination for the particular date and the assumed latitude is set in by the use of slewing knob. The celestial navigation computer will then assume a position corresponding to the information set in, and will produce outputs in azimuth and elevation from the generators 51 and 55. These will be supplied to the radio sextant through synchro differential generators 106 and 118 to cause the radio sextant to point approximately at the sun. Once the sextant has located the sun it will produce error signals at terminals 113 and 123 as described in the abandoned patent application Serial Number 121,126, filed October 13, 1949, and will thereafter automatically track the radiating body.

The discrepancies between the outputs of the sextant and the celestial navigation computer will appear as latitude and hour angle errors at the outputs of the latitude and longitude error signal computers 132 and 133. These will be supplied through the computer's control system to adjust the hour angle and latitude so as to close the servo loops. It is also to be noted that dead reckoning information is continually fed through the dead reckoning computer and into the system. Rate lags in the main system servo loops are thereby avoided. Once the servo loops have been completed for a sufficient time to produce a reasonable agreement between the setting of the celestial navigation computer and the radio sextant, fixes of a much higher quality than are available from the sextant alone will be continuously indicated by the longitude and latitude dials.

It is to be realized that a visual star tracker may be substituted for the radio sextant and if the star is continually tracked visually and azimuth and elevation outputs removed therefrom, the system may be adapted for this use.

Although this system has been described in respect to a preferred embodiment, it is to be realized that the broad principle herein disclosed is that of combining the output of a tracking apparatus with a computer which takes advantage of the known quantities and utilizes the known information in a manner such that a resultant fix may be continuously indicated.

Although the invention has been described with respect to preferred embodiments thereof, it is not to be so limited as changes and modifications may be made therein which are within the full intended scope of the invention as defined by the appended claims.

I claim:

1. A navigation instrument for continually presenting the geographic position of a craft comprising, a radio sextant on said craft and mounted on azimuth and elevation axes and producing elevation and azimuth error signals, an azimuth motor connected to said radio sextant, an elevation motor connected to said radio sextant, a celestial navigation computer, an azimuth synchro generator mounted on said celestial navigation computer and producing a signal proportional to the computed azimuth of a celestial body, an elevation synchro generator mounted on said celestial computer and producing a signal proportional to the computed elevation of the celestial body, a first synchro differential generator receiving the azimuth error signal from said radio sextant and the output of the azimuth synchro generator, the output of said first synchro differential generator connected to said azimuth motor to drive said radio sextant in azimuth, a second synchro differential generator receiving the elevation error signal and the output of the elevation synchro generator, and the output of said second synchro differential generator connected to said elevation motor to drive said radio sextant in elevation.

2. A system for continually indicating the geographic position of a moving craft comprising, a radio sextant mounted on elevation and azimuth axes, an azimuth motor connected to said radio sextant to drive it in azimuth, an elevation motor connected to said radio sextant to drive it in elevation, said radio sextant producing azimuth and elevation error signals, a celestial navigation computer having hour angle, azimuth, elevation and latitude axes, a frequency generator producing a stabilized output, a synchronous motor receiving the output of said frequency generator, a first differential receiving a shaft input from said synchronous motor, said first differential receiving a second shaft input proportional to the Greenwich hour angle of the celestial body under observation, a second differential receiving an input from the first differential and a second input proportional to the sidereal hour angle of the celestial body under observation, a third differential receiving a shaft input from said second differential, said third differential also receiving a shaft input proportional to the assumed longitude of said craft, a local hour angle control transformer receiving a shaft input from said third differential, an hour angle motor mounted on said celestial navigation computer and receiving an input from said local hour angle control transformer, an hour angle synchro generator connected to the hour angle shaft of said celestial navigation computer and supplying an input to said local hour angle control transformer, a dead reckoning computer resolving the craft's heading and velocity into rates of change of latitude and longitude, a latitude motor connected to said celestial navigation computer and receiving an input from said dead reckoning computer, a latitude synchro generator connected to said celestial navigation computer and producing an output proportional to the latitude of said craft, indicating means connected to said latitude synchro generator to indicate the craft's latitude, an azimuth synchro generator mounted on said celestial navigation computer and producing an output proportional to the azimuth angle, a first synchro differential generator receiving the output of said azimuth synchro generator and an input corresponding to the azimuth error signal of said radio sextant, said first synchro differential generator supplying an output to said azimuth motor on the radio sextant, an elevation synchro generator mounted on said celestial navigation computer producing an output proportional to the computer elevation, a second synchro differential generator receiving the output of the elevation synchro generator and an input corresponding to the elevation error signal of the radio sextant, and the output of said second synchro differential generator connected to the elevation motor of said radio sextant.

3. A celestial navigation computer comprising, a base member, a first pair of uprights mounted on said base member, a first annular member rotatably supported between said first pair of uprights, a latitude synchro generator connected to said first annular member, a latitude motor connected to said first annular member to rotate it, a second ring mounted within the first annular member and rotatable relative thereto, an hour angle motor connected to the first annular member and connected to drive the second ring, an hour angle synchro generator mounted to the first annular member and connected to said hour angle motor, and producing an electrical output proportional to the relative positions of the first annular member and the second ring, a third L-shaped upright mounted on said base member, a vertical sleeve rotatably supported on said L-shaped upright, an azimuth synchro generator mounted on said L-shaped upright and with its input shaft connected to said sleeve so as to produce an electrical output signal proportional to the computed azimuth, a horizontal elevation shaft attached to said sleeve, an arm rotatably supported by said horizontal elevation shaft and extending to said second ring and operatively connected to said second ring, an elevation synchro generator supported from said sleeve and receiving a shaft input proportional to the position of said arm so as to produce an elevation signal.

4. A celestial navigation computer comprising, a base member, a first pair of uprights mounted on said base member, a first annular member rotatably supported between said first pair of uprights, a latitude synchro generator connected to said first annular member, a latitude motor connected to said first annular member to rotate it, a second ring mounted within the first annular member and rotatable relative thereto, an hour angle motor connected to the first annular member and connected to drive the second ring, an hour angle synchro generator mounted to the first annular member and connected to said hour angle motor and producing an electrical output proportional to the relative positions of the first annular member and the second ring, a third L-shaped upright mounted on said base member, a vertical sleeve rotatably supported on said L-shaped upright, an azimuth synchro generator mounted on said L-shaped upright and with its input shaft connected to said sleeve so as to produce an electrical output signal proportional to the computed azimuth, a horizontal elevation shaft attached to said sleeve, an arm rotatably supported by said horizontal elevation shaft and extending to said second ring and operatively connected to said second ring, the connection between said arm and said second ring adjustable for changes in declination, an elevation synchro generator supported from said sleeve and receiving a shaft input proportional to the position of said arm so as to produce an elevation signal.

5. A celestial navigation computer comprising, a base member, a first pair of uprights mounted on said base member, a first annular member rotatably supported between said first pair of uprights, a latitude synchro generator connected to said first annular member, a latitude motor connected to said first annular member to rotate it, a second ring mounted within the first annular member and rotatable relative thereto, an hour angle motor connected to the first annular member and connected to drive the second ring, an hour angle synchro generator mounted to the first annular member and connected to said hour angle motor and producing an electrical output proportional to the relative positions of the first annular member and the second ring, a third L-shaped upright mounted on said base member, a vertical sleeve rotatably supported on said L-shaped upright, an azimuth synchro generator mounted on said L-shaped upright, and with its output shaft connected to said sleeve so as to produce an electrical input signal proportional to the computed azimuth, a horizontal elevation shaft attached to said sleeve, an arm rotatably supported by said horizontal elevation shaft, said arm operatively connected to said second ring, a declination motor mounted on said second ring and connected to said arm to move it relative to said second ring, an elevation synchro generator supported from said sleeve and receiving a shaft input proportional to the position of said arm so as to produce an elevation signal.

6. A system for continually presenting the position of a craft comprising, a tracking mechanism mounted on said craft and adapted to track a celestial body, said tracking mechanism developing first azimuth and first elevation signals, a celestial navigation computer mounted on said craft and continually computing second azimuth and second elevation signals of the celestial body, means for combining said first and second azimuth signals to develop a differential azimuth signal, means for combining said first and second elevation signals to develop a differential altitude signal, a latitude error signal computer receiving said differential azimuth signal and said differential altitude signal to produce a latitude error signal to drive the celestial navigation computer in latitude, and a longitude error signal computer receiving said differential azimuth signal and said differential altitude signal to produce a longitude error signal which is supplied to the celestial navigation computer to operate it for changes in longitude.

7. In apparatus according to claim 6 wherein said latitude error signal computer comprises, eight resolvers, the first resolver receiving an electrical input proportional to said differential altitude signal, an elevation servo driving the first resolver, a latitude servo driving the second and third resolvers, said second and third resolvers receiving inputs from the first resolver, an azimuth servo driving the fourth resolver, said fourth resolver receiving an input from the second resolver, the fifth resolver driven by the elevation servo and receiving an input proportional to said differential azimuth signal, the sixth resolver receiving the output of the fifth resolver and driven by the latitude servo, the seventh resolver receiving an input from the sixth resolver and driven by the azimuth servo, an hour angle servo driving the eighth resolver, a potentiometer connected to a source of alternating current, a motor connected to the variable contact of said potentiometer, said eighth resolver and output terminals receiving input from said potentiometer, the outputs of said third, fourth, seventh and eighth resolvers being combined, said motor receiving the combined outputs, and said variable contact being positioned in response to operation of said motor to produce the computed latitude error signal on said output terminals.

8. Apparatus according to claim 6 wherein said longitude error signal computer comprises five resolvers, the first resolver receiving an electrical input proportional to the elevation error, an elevation servo connected to the first resolver, the second resolver receiving the electrical output of the first resolver, an azimuth servo connected to drive the second servo, the third resolver receiving an electrical input proportional to the azimuth error, an elevation servo connected to said third resolver, the fourth resolver receiving the electrical output of the third resolver, said azimuth servo connected to said fourth resolver, the outputs of the second and fourth resolvers being combined to subtract, and the differences being combined with the output of the fifth resolver, an hour angle servo driving the fifth resolver, a motor receiving the combined outputs of the second, fourth and fifth resolvers, a potentiometer connected to a source of alternating current and having its variable contact driven by said motor, said fifth resolver and output terminals receiving input from said potentiometer, and said variable contact being positioned in response to operation of said motor to produce said longitude error signal on said output terminals.

References Cited in the file of this patent

UNITED STATES PATENTS

| | | |
|---|---|---|
| 1,845,860 | Willis | Feb. 16, 1932 |
| 2,077,398 | Clark | Apr. 20, 1937 |
| 2,444,933 | Jasperson | July 13, 1948 |
| 2,762,123 | Schultz et al. | Sept. 11, 1956 |

UNITED STATES PATENT OFFICE
CERTIFICATE OF CORRECTION

Patent No. 2,857,672                                    October 28, 1958

David O. McCoy

It is hereby certified that error appears in the printed specification of the above numbered patent requiring correction and that the said Letters Patent should read as corrected below.

Column 16, line 15, for "output" read -- input --; line 16, for "input" read -- output --; column 17, line 6, for "differences" read -- difference --.

Signed and sealed this 24th day of February 1959.

(SEAL)
Attest:

KARL H. AXLINE
Attesting Officer

ROBERT C. WATSON
Commissioner of Patents